United States Patent [19]

Di Cesare et al.

[11] Patent Number: 5,895,437
[45] Date of Patent: Apr. 20, 1999

[54] METHOD FOR CONTINUOUS UPDATING IN REAL TIME OF BIDIMENSIONAL AND TRIDIMENSIONAL SEISMIC IMAGES OF A SUBSURFACE SECTION USING DRILLING WELL DATA

[75] Inventors: Franco Di Cesare, Donato Milanese; Luca Aleotti, Peschiera Borromeo; Luca Savini, Milan, all of Italy

[73] Assignee: AGIP S.p.A., Milan, Italy

[21] Appl. No.: 08/665,560

[22] Filed: Jun. 18, 1996

[30] Foreign Application Priority Data

Jul. 28, 1995 [IT] Italy ................. MI95A1653

[51] Int. Cl.⁶ ........................................ G06F 19/00
[52] U.S. Cl. ........................................ 702/9
[58] Field of Search ........................ 364/421, 422; 367/73, 72; 702/6, 9

[56] References Cited

U.S. PATENT DOCUMENTS

| | | | |
|---|---|---|---|
| 5,064,006 | 11/1991 | Waters et al. | 367/73 |
| 5,191,557 | 3/1993 | Rector et al. | 364/421 |
| 5,513,150 | 4/1996 | Sicking et al. | 367/73 |

*Primary Examiner*—Donald E. McElheny, Jr.
*Attorney, Agent, or Firm*—Kramer Levin Naftalis & Frankel; George P. Hoare, Jr.

[57] ABSTRACT

Method for the continuous up-dating of a bidimensional and tridimensional seismic image in depth in real time during the drilling of a well by using seismic velocity information comprising the initial definition of a velocity model and the subsequent re-iterative modification of this initial velocity model by integrating the geophysical data taken on the surface with the geological domain of the subsurface data obtained directly during the drilling of the well.

3 Claims, 5 Drawing Sheets

METHOD FOR CONTINUOUS UPDATING IN REAL TIME OF BIDIMENSIONAL AND TRIDIMENSIONAL SEISMIC IMAGES OF A SUBSURFACE SECTION USING DRILLING WELL DATA

BACKGROUND OF THE INVENTION

The present invention relates to a method for the continuous up-dating of a seisimic image in depth during the drilling of a well, by using seismic velocity information as it becomes available. According to this method, every new image taken, precisely calibrated to the results of the well obtained up to that moment, enables a better definition of the horizons below the rock bit and consequently an increasingly more accurate control of the subsequent drilling phases. The seismic image can be a "section" in the case of bidimensional data or a "volume" in the case of tridimensional data.

OBJECTS AND SUMMARY OF THE INVENTION

It is an object of the present invention to provide a method for continuous updating in real time of bidimensional and tridimensional seismic images of a subsurface section using drilling well data as it becomes available.

It is a further object of the present invention to overcome inherent deficiencies of prior methods for obtaining seismic images of subsurface sections.

In accordance with one form of the present invention, a method for continuous updating in real time of bidimensional and tridimensional seismic images of a subsurface section during drilling of a well by using seismic velocity information includes obtaining an initial definition of a velocity model corresponding to geophysical data of a subsurface section measured from the earth's surface, obtaining geophysical data of the subsurface section from the well during drilling of the well, integrating the obtained geophysical data measured from the earth's surface with the geophysical data obtained directly during the drilling of the well to obtain integrated data, and reiteratively modifying, in real time, the initial velocity model on the basis of the integrated data.

The method proposed is based on the real time use of all the velocity information which can be acquired from a drilling well to produce, while drilling, a seismic image with an in-depth scale, by repeatedly up-dating the relative velocity range.

Starting from a reference image in depth obtained with an initial velocity range prevalently or completely deriving from the reflection shooting, the method allows the depth migration process of the seismic datum to be potentially continuously repeated in real time during the drilling of the well, practically at reasonable intervals of depth selected each time on the basis of the horizons which are seismically most significant.

The advantage of this method is to exploit in real time subsequent up-datings of the seismic images in depth which are gradually identified with a geological cross-section on which operative selections, also of great importance, can be made, such as: variation of the intermediate levels of piping, deviation of the original trajectory of the hole, redefinition of the depth of the various mining targets, coring, etc.

In short this "migration while drilling continuously" (MWDC) implements a new way of monitoring the advancement of the drilling, which can be defined as geophysical. The availability of more and more sophisticated seismic images in depth relating to the well results allows a more accurate and timely control.

DETAILED DESCRIPTION OF THE PREFERRED EMBODIMENT

Figure 1:
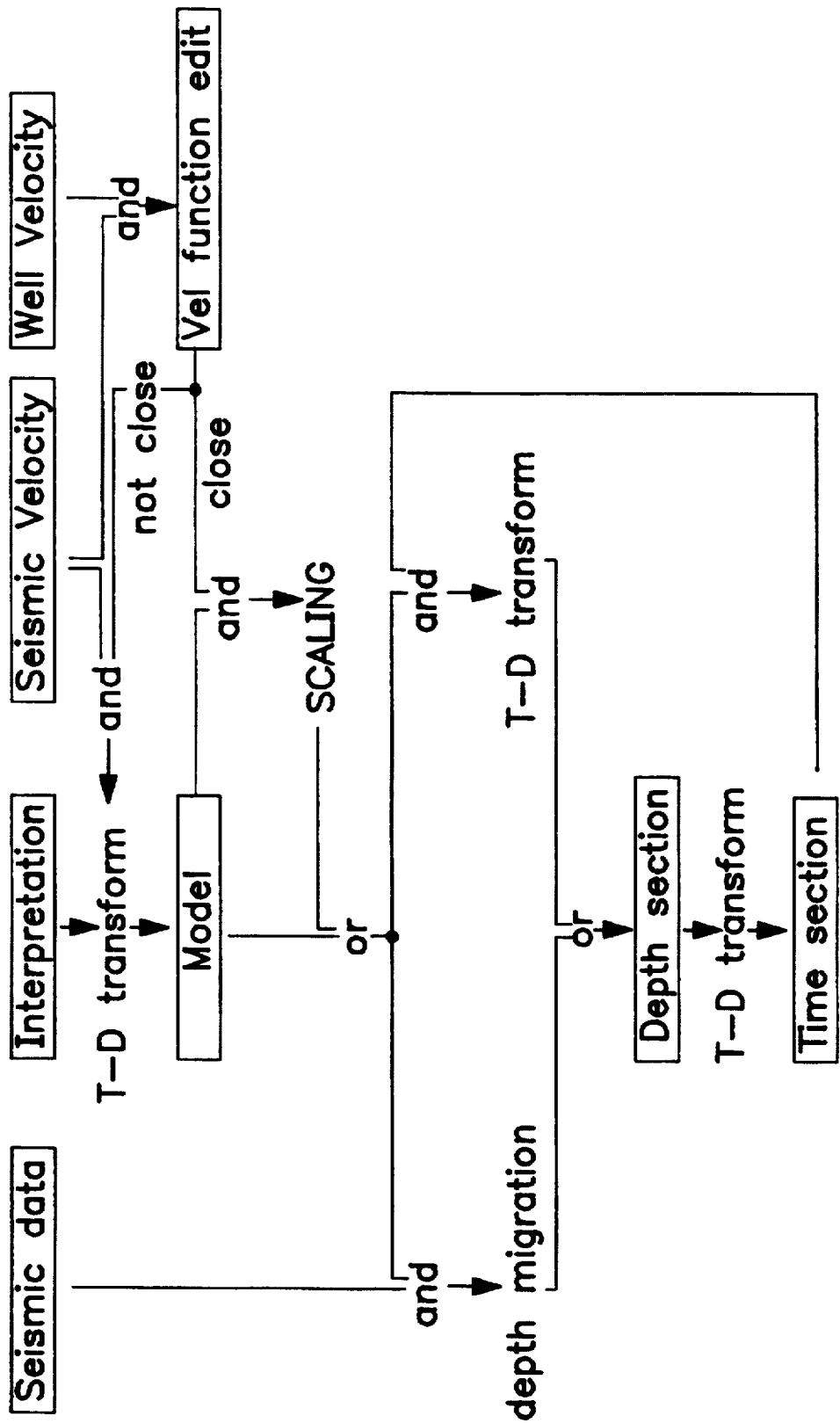
FIG. 1 is a flow chart of the method of the present invention.

Seismic migration forms a fundamental step in the sequence of seismic data processing acquired with the reflection technique. The migration step generally arrives at the end of the conventional processing sequence and aims at collocating the various seismic horizons in their correct spacial position in the time section or depth section.

The aim of the whole processing procedure of the seismic data is to obtain an in-depth image comparable to a geological cross-section.

In particular the necessity of "migrating" a seismic datum derives from the fact that the conventional stack sections, in which a certain position in the subsurface ideally corresponds to each track, actually have information (reflections) relating to different spacial positions with respect to the vertical of the watch point.

An error in the position and geometry of the geological structures in the seismic (stack) sections is due to the fact that one of the basic assumptions of the reflection shooting method, i.e. that the reflection point on a given acoustic interface in the subsurface is equidistant with respect to the energization and reception points, is not expected in the very common non-flat-parallel stratification situation, with variously inclined horizons.

Another simplification of the actual situation, which must be corrected during the migration phase, is that the seismic velocities of the various horizons are constant and homogeneous (isotrope medium). It is known, on the other hand, that the complex sedimentary and tectonic processes can cause more or less significant variations in the lithologies and consequently in the velocities.

It is evident that if a study of the area leads to the decision to drill a structure, a precise knowledge of the position (depth) and its actual form would help to reduce the mining risk.

The migration process (both in times and depth) involves the calculation of solutions to the wave equations. It enables the position to be established (in time or space) of a wave front datum at any moment of its propagation in the subsurface; there are basically three different methods: Kirchhoff, finite-difference and Fourier transform.

Numerous algorithms such as "frequency-wavenumber" (f-k), "frequency-distance" (f-x) "phase shift", etc. can be applied within these methods.

As already specified, the depth migration schemes require in input "stack" (non-migrated) seismic sections or volumes and an accurate velocity model (migration velocity). Approximate information on the velocity range can lead to high levels of inaccuracy in the results, consisting of seismic sections in-depth scale.

Especially in explorative areas, with limited well data available, the only source of information relating to the velocity ranges is the seismic datum itself.

It should be remembered that the seismic velocities have a totally different meaning from the well velocities: the former, also called provelocities "derive" from signal analysis, to obtain the best seismic image ("best focusing"), the latter, which have a precise physical meaning (propagation velocity in the rock formations), are actually "measured" and allow the time image to be converted into a depth image which respects the well results. For this reason, and this is becoming clearer with growing experience in the field of depth migrations (once limited by the limited calculation capacity), the velocities deriving from the shooting ("stacking velocity" and the like) can differ greatly from the well velocities.

It is evident that the possibility of having these latter velocities during the well-drilling itself would enable an innovative control of the results.

Among the possible input data, the stacking velocities with recording systems in the well which use the sound produced by the rock bit as a source of acoustic energy are those which allow the best integration with the migration velocities. Among these methods, the system described in Italian patent application IT-A-MI9300196 of 5.2.1993 (hereinafter called SEISBIT) can be mentioned, as an example.

The innovative idea on which the proposed method is based is illustrated in the general diagram of FIG. 1. (The diagram illustrates as an example a case 2D).

With reference to this FIG. 1 (where the blocks of interest are defined in current operating terminology), the up-dating of the seismic section (Depth section) or (Time section) is achieved by means of a migration process (depth migration) and/or conversion (T-D transform) from the time section to the depth section (space) of the seismic data with the use of a velocity model up-dated with the well information.

The initial velocity model is generally defined by means of modelling technologies (Ray-tracing) which start from seismic velocity analysis and interpretation.

This model is subsequently repeatedly modified. This is carried out by "integrating" the input velocity data i.e. the section of geophysical data obtained at the surface (seismic velocity), on the basis of which the well was positioned characterized by a vertical scale in times, with the geological section of the subsurface data (well velocity), deriving from the drilling and whose vertical reference scale is obviously the depth.

In other words, the starting velocity model is modified by "adapting" the velocity values of the rock formations actually crossed by the well to the seismic velocity model and laterally and vertically extrapolating these velocities on the basis of the structural interpretation of the section itself (Vel. function edit).

The procedure involves two different "directions" ("close" or "not close") which the user can follow depending on the approximation of the velocity model and the shifting between the seismic velocities and the well velocities, approaches which basically involve up-dating the geological model (geometries+velocities) described in depth: the first by means of modelling methods (Ray-tracing) and the second by a vertical conversion (scaling).

Consequently, according to the present invention, the original shooting in depth (deriving from the conventional seismic methods) is continuously up-dated by integrating the velocity information, progressively available from the well, in the starting model. The new resulting seismic image, which is more reliable as it is precisely calibrated to the first part of the hole already completed, enables a better definition of the horizons below the rock bit and therefore better control of the subsequent drilling phases and more accurate decisions of technical and economical importance.

Figure 2:
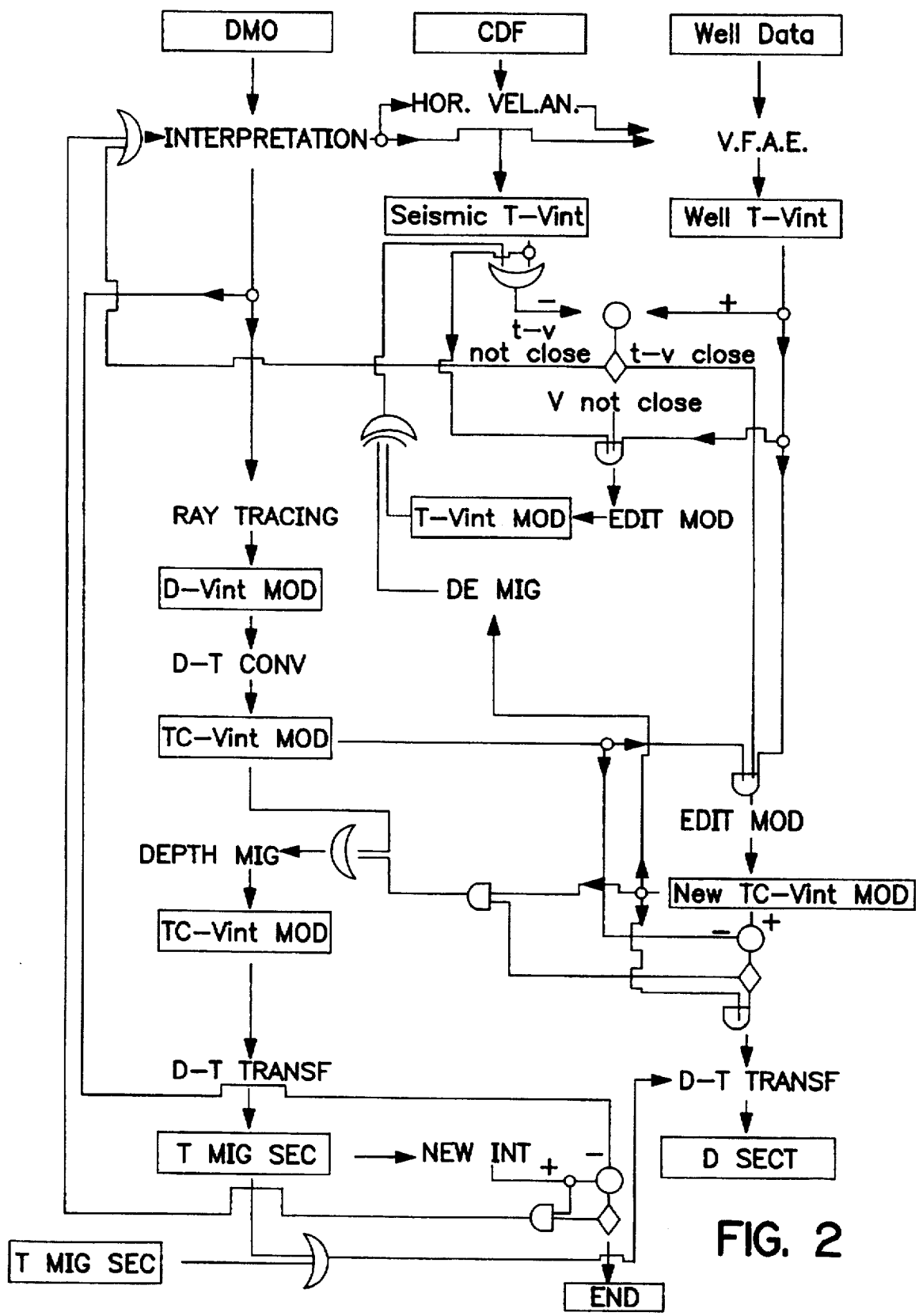
FIG. 2 is detailed logic flow chart of the method of the present invention.

FIG. 2 on the other hand illustrates in detail the logical flow. The method shown in FIG. 2 comprises a series of processing procedures interlinked to produce a seismic report in real time.

These operations, which are based both on known algorithms and others appropriately developed, define an innovative procedure both in the application of the algorithms themselves and in the results produced.

In fact, unlike the known procedures for depth migration of the seismic datum in which the bi/tridimensional velocity model is repeatedly optimized to obtain the best seismic image (after acquiring all the existing velocity data), this method starts, on the other hand, from a velocity model and section called "reference" (which are the final result of the known methods) for automatically integrating the model in real time with the information coming from the well.

The result is a seismic image obtained contemporaneously to the acquisition of well velocity information, consistent with the well data and therefore always more "real" in terms of both depth and geometries of the structure under examination.

One of the essential points of the method is the integration between the well velocity data (recorded in one point) and the seismic velocity range (velocities having a different physical meaning), an integration which must be automatic and continuous.

The estimation of the well velocity function is carried out with the process called Velocity Function Adaptative Estimator (VFAE) which starting from the velocity data obtained in various ways during the drilling (among which, for example, Seisbit VSP and intermediate acoustic logs, while-drilling acoustic logs, sonic measurements on cuttings/cores), enables the new velocity profile to be calculated. This is carried out with linear and non-linear regression techniques which allow the velocity of the horizons to be estimated, also interpreted below the position of the bit.

This new velocity information is inserted as input datum in a flow of operations suitably organized to edit the previous velocity model.

The method thus created will enable a new seismic image in depth (and in times) to be obtained by means of the migration or conversion algorithms.

A description follows, as an example, of an application of the innovative method of the present invention.

Figure 3:
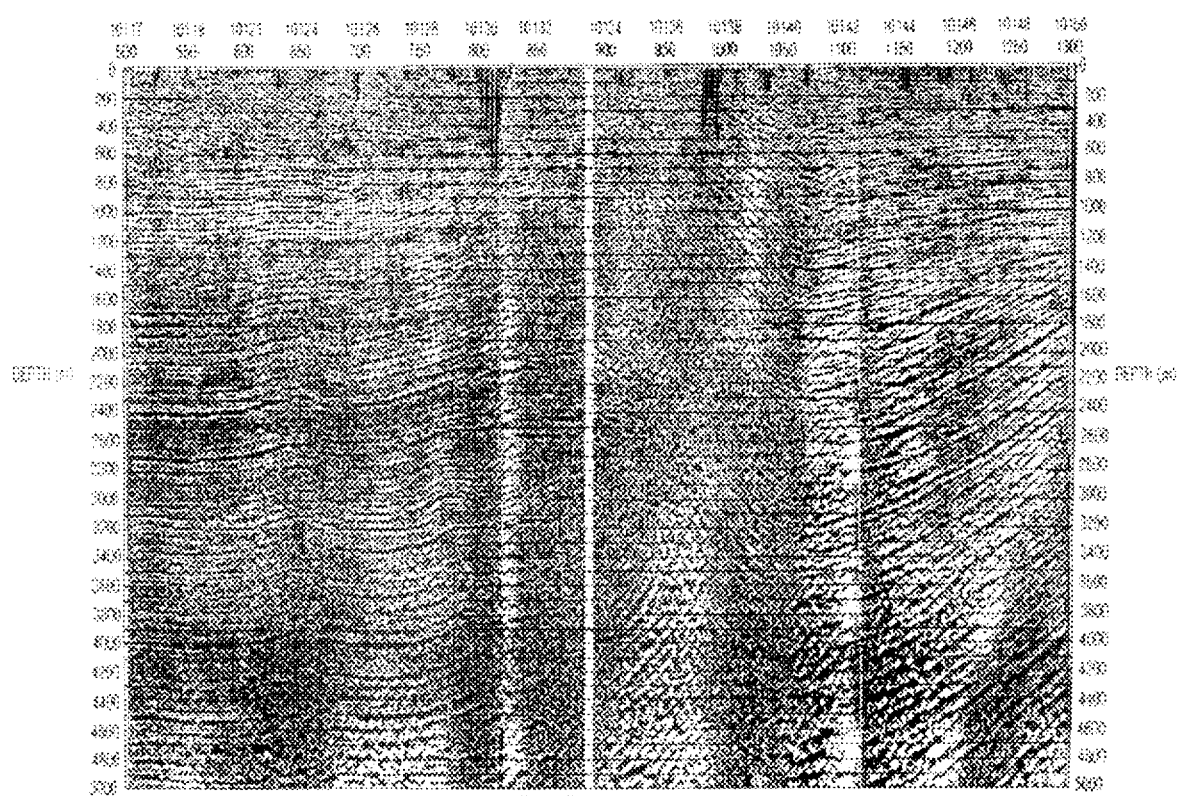
FIG. 3 is a seismic section in depth scale prior to the commencement of drilling.

FIG. 3 shows a seismic section in depth scale, passing through the position of a well.

This image represents the conventional report available before the drilling starts; it is obtained by migrating the corresponding stack section in depth in time scale using a seismic velocity model deriving exclusively from the processing itself of the seismic line under examination. No information on the well velocity, not even adjacent, was available. This section is the one which was previously defined as "reference".

When the drilling began, some information on the seismic velocities relating to the sequence effectively encountered in the well, became available: this derives from seismic and acoustic measurements while-drilling, cutting measurements, etc.

Analysis of these data, continuously up-dated, with procedures of the VFAE type led to the definition of a new velocity function which was integrated in the original velocity model.

Figure 4:
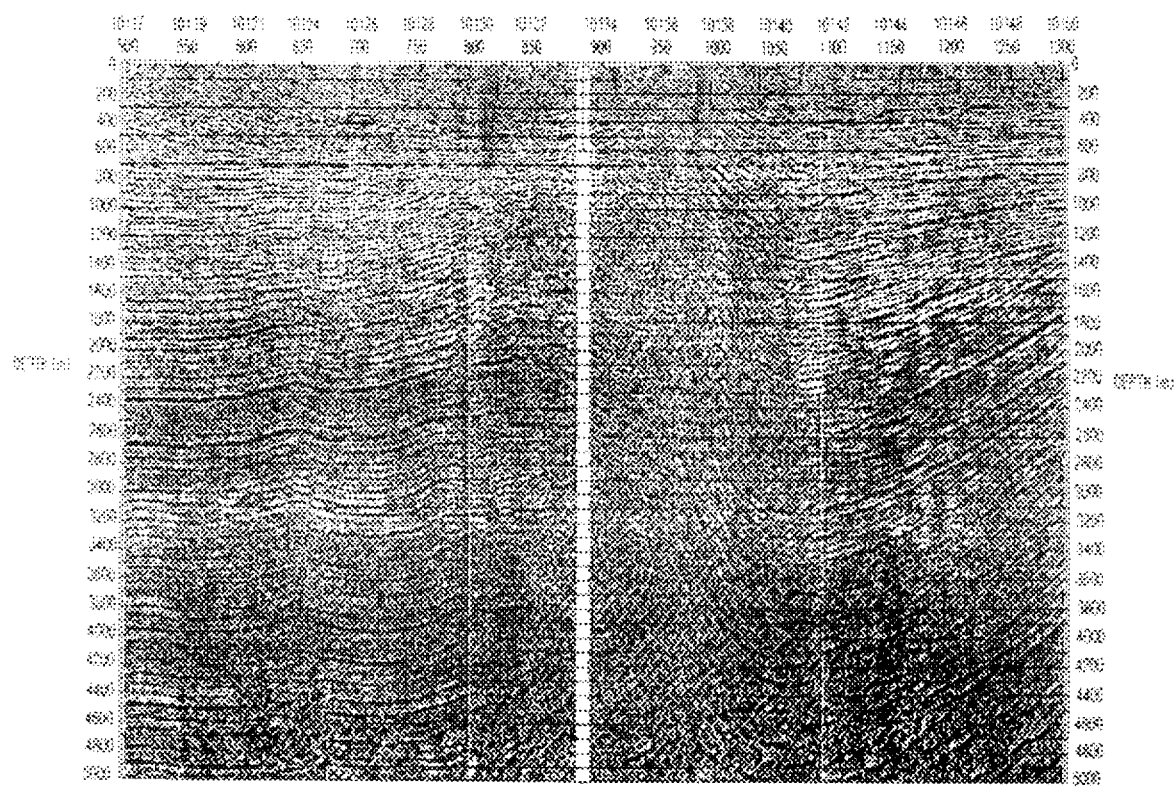
FIG. 4 is the seismic section in depth scale of FIG. 3 updated to include new depth migration of well drilling at a depth of 600 meters.

FIG. 4 shows the result of the new depth migration effected, during the drilling, with the well indications obtained up to a depth of about 600 meters (iter-1).

With respect to the "reference" section some changes, relating to the velocity which is lower than anticipated, can be observed. In general there is an upward movement, of about 50 meters, of the whole series (see for example the reflectors, "black peaks", originally at 1480, 1980 and 2420 meters which move to 1450, 1930 and 2380 meters respectively).

Figure 5:
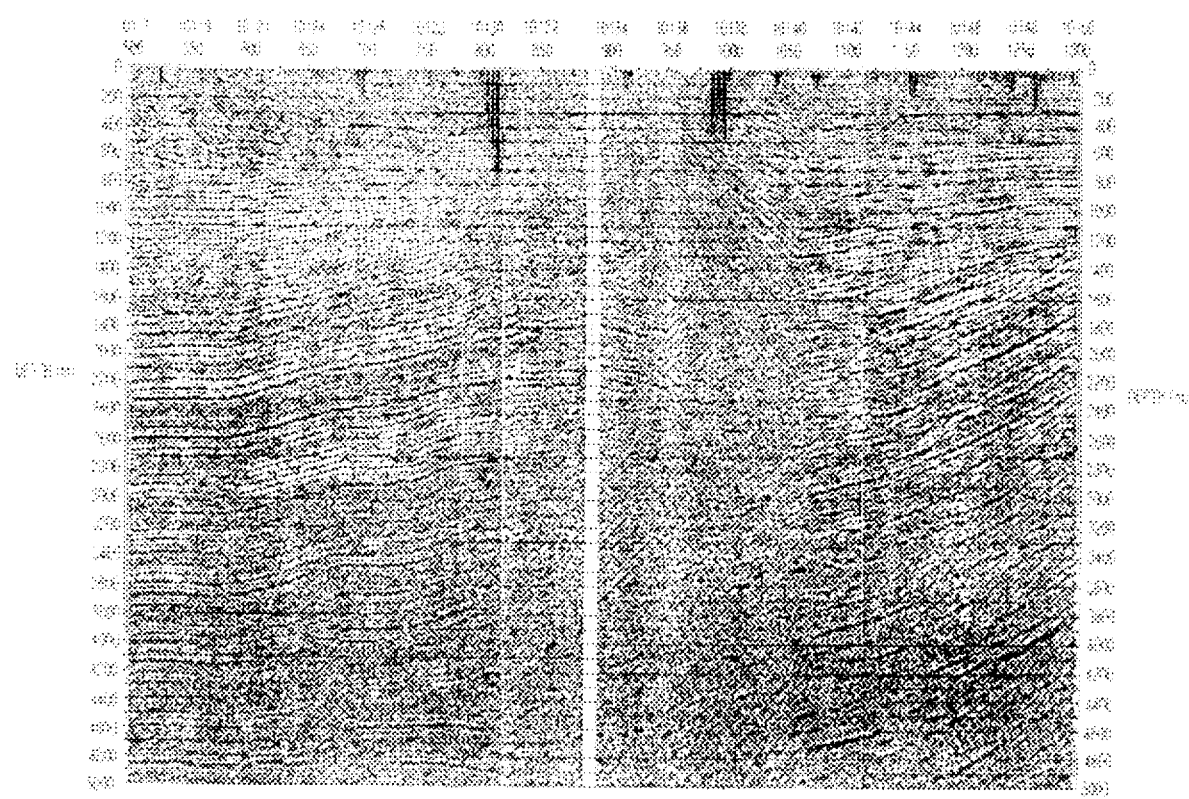
FIG. 5 is the seismic section in depth scale of FIG. 4 updated to include new depth migration of well drilling at a depth of 2000 meters.

FIG. 5 shows a subsequent up-dating (iter-6) which takes into consideration the well information up to a depth of over 2000 meters. In this case the variations with respect to the "reference" section are much greater and relate not only to the structural aspects of the section but also to the same quality of the seismic signal. The portion on the right with respect to the position of the well, extremely complex owing to the presence of tectonic elements (faults) to a great extent, seems more "legible" (interpretable) thanks to this better "organization" (focalization) of the signal. The horizons previously considered are now situated at a depth of 1320 (−160 meters compared to the "reference") 1710 (−270 meters) and 2080 (−340 meters) respectively.

As can be seen in the example, the proposed technique allows the method to be substantially modified from an operative point of view; these modifications of the original section during the drilling have enabled both technically and economically important decisions to be made, such as the modification of the levels of piping of the hole and, starting from a depth of about 2200, the progressive deviation of the well trajectory, originally programmed as vertical, up to a displacement of over 1 kilometre compared to the initial project.

FIG. 5, which shows the logical flow in detail, repeats the plots of this. FIG. 5 should be interpreted as follows:
INPUT DATA
|DMO| seismic section processes up to the dmo stack
|CDF| prestack seismic data (common depth family)
|WELL DATA| velocity data (generally a time-depth function)
OUTPUT DATA
|D SECT| seismic section or volume migrated in depth
|T SECT| seismic section or volume migrated in times
VELOCITY MODELS OR FUNCTIONS
|WELL T-Vint| velocity function defined in the well transverse position
|SEISMIC T-Vint| Seismic interval velocity model described in times
|T-Vint MOD| Interval time-velocity model
|D-Vint MOD| Interval depth-velocity model
|TC-Vint MOD| Model coverted from depth to times with a conversion on the vertical
|NEW T-Vint MOD| New interval time-veloctiy model
|NEW TC-Vint MOD| New model converted from depth to times with a conversion on the vertical
PROCESSES
INTERPRETATION description of the geometries on the seismic section
HOR VEL AN analysis and definition of the seismic velocities consistent with the horizons
VFAE Automatic analysis of the D/T interpretation curve and bestfitting geometries, calculation of the new interval velocity function
EDIT MOD up-dating and modification of the model
RAY TRACING allocation in depth of the time model with ray tracing algorithms
DEMIG conversion depth-times with ray tracing algorithms
D-T CONV vertical conversion depth-times
DEPTH MIG algorithm of depth migration
D-T TRANSF conversion of the seismic datum from depth to times Although the present invention has been described with reference to the accompanying drawings, it is to be understood that changes may be affected therein by one skilled in the art within the scope of the claimed invention.

We claim:

1. A method for continuous updating in real time of bidimensional and tridimensional seismic images of a subsurface section during drilling of a well by using seismic velocity information, the method comprising the steps of:

obtaining an initial definition of a velocity model corresponding to geophysical data of the subsurface section measured from the earth's surface;

obtaining geophysical data of the subsurface section from the well during drilling of the well;

integrating, in real time, the obtained geophysical data measured from the earth's surface with the geophysical data obtained directly during the drilling of the well to obtain integrated data; and reiteratively modifying, in real time, the initial velocity model on the basis of the integrated data.

2. The method of claim 1, wherein the initial velocity model is defined by seismic velocities and interpretation thereof, before drilling of the well.

3. The method of claim 1, wherein the initial velocity model is modified by adapting velocity values of rock formations actually encountered during drilling of the well to the initial velocity model, and laterally and vertically extrapolating said velocity values of said rock formations, in real time, on the basis of a structural interpretation of the subsurface section itself.

* * * * *